(12) United States Patent
Kays, Jr. et al.

(10) Patent No.: US 6,249,822 B1
(45) Date of Patent: *Jun. 19, 2001

(54) REMOTE PROCEDURE CALL METHOD

(75) Inventors: David E. Kays, Jr., Bellevue; Vibhas D. Chandorkar, Issaquah, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/428,318

(22) Filed: Apr. 24, 1995

(51) Int. Cl.[7] ............................................. G06F 9/00
(52) U.S. Cl. ............................................................ 709/330
(58) Field of Search ........................... 395/200.05, 800, 395/200, 650, 680, 681, 682, 683, 684; 570/58.2; 709/300, 301, 302, 303, 304, 310–332

(56) References Cited

U.S. PATENT DOCUMENTS

| | | | |
|---|---|---|---|
| 5,007,080 | 4/1991 | MacMillan et al. | 379/269 |
| 5,062,040 | 10/1991 | Bishop et al. | 709/318 |
| 5,125,091 | 6/1992 | Staas, Jr. et al. | 709/101 |
| 5,129,084 | 7/1992 | Kelly, Jr. et al. | 709/104 |
| 5,187,790 | 2/1993 | East et al. | 709/316 |
| 5,218,699 | 6/1993 | Brandle et al. | 709/328 |
| 5,307,490 | 4/1994 | Davidson et al. | 709/328 |
| 5,329,619 | 7/1994 | Pagé et al. | 709/203 |
| 5,355,453 * | 10/1994 | Row et al. | 709/219 |
| 5,375,207 * | 12/1994 | Blakely et al. | 709/203 |
| 5,377,350 | 12/1994 | Skinner | 709/316 |
| 5,428,782 * | 6/1995 | White et al. | 709/101 |
| 5,430,876 | 7/1995 | Schreiber et al. | 709/328 |
| 5,434,852 * | 7/1995 | La Purta et al. | 370/385 |
| 5,434,999 * | 7/1995 | Goire et al. | 717/11 |
| 5,442,771 * | 8/1995 | Filepp et al. | 709/219 |
| 5,463,625 | 10/1995 | Yasrebi | 370/401 |
| 5,465,351 | 11/1995 | Lemmo | 707/10 |
| 5,497,463 * | 3/1996 | Stein et al. | 709/203 |
| 5,511,197 | 4/1996 | Hill et al. | 709/328 |
| 5,517,645 | 5/1996 | Stutz et al. | 709/316 |
| 5,524,256 * | 6/1996 | Turkowski et al. | 712/300 |
| 5,526,491 | 6/1996 | Wei | 709/330 |
| 5,546,584 | 8/1996 | Lundin et al. | 709/315 |
| 5,577,251 * | 11/1996 | Hamilton et al. | 709/100 |
| 5,684,955 | 11/1997 | Meyer et al. | 709/316 |
| 5,724,588 * | 3/1998 | Hill et al. | 709/328 |
| 5,778,228 | 7/1998 | Wei | 709/328 |
| 6,108,715 * | 8/2000 | Leach et al. | 709/330 |

OTHER PUBLICATIONS

Linthicum, "DCE Lightens its Load," DBMS Online, Jun., 1996.

Orfali et al., *Essential Client/Server Survival Guide*, John Wiley & Sons, Inc. Chapter 9, p. 119–128, 1994.

(List continued on next page.)

*Primary Examiner*—John St. Covrtenay, III
(74) *Attorney, Agent, or Firm*—Klarquist Sparkman Campbell Leigh & Whinston LLP (57) ABSTRACT

A computer network includes a client and a server which are preferably independently operable computers that cooperate to perform different procedures of an application program. The server executes its procedure in response to a remote procedure call transmitted over the computer network from the client. The remote procedure call typically includes one or more data structures or parameters used as arguments for executing the remote procedure. The server receives the remote procedure call at an RPC buffer. In accordance with the present invention, the server interprets the parameters while the remote procedure call resides in the RPC buffer whenever the selected format of the parameters of the remote procedure call matches the data structure format processed by the server.

14 Claims, 4 Drawing Sheets

OTHER PUBLICATIONS

Brockschmidt, *Inside Ole*, $2^{nd}$ Edition, Chapter 6, p. 227–338, 1995.

Rosenberry et al., *Distributing Applications Across DCE and Windows NT*, O'Reilly & Associates, Inc., p 43–62, 1993.

Kessler, "A Client–Side Stub Interpreter," *ACM SIGPLAN Notices*, SunSoft, Inc., vol. 29, No. 8, p 94–100, 1994.

Bloomer, *Power Programming with RPC*, O'Reilly & Associates, Inc., p 1–16, 1991.

*Application Environment Specification Distributed Computing RPC Volume*, Open Software Foundation, Revision A, PTR Prentice Hall, Chapters 2, 4, 5, 6, 7, and 14, 1994.

Nelson, *Remote Procedure Call*, Xerox Palo Alto Research Center, May 1981.

Finnegan, "Building Windows NT–Based Client/Server Applications Using Remote Procedure Calls," *Microsoft Systems Journal*, vol. 9, No. 10, p. 65 (13), 1994.

Dineen et al., "The Network Computing Architecture and System: An Environment for Developing Distributed Applications," *IEEE*, p. 296–299, 1988.

*ORB 2.0 RFP Submission DCE Common Inter–ORB Protocol*, OMG TG Document 94.9.41, Ver. 1.0, 1994.

*The Component Object Model Specification (Draft)*, p. 1–193, 1995.

Purdy et al., "Integrating an Object Server with Other Worlds," *Abstract, ACM Transactions on Office Information Systems*, vol. 5, No. 1, p. 1, 1987.

McCullough, "Transparent Forwarding: First Steps," OOPSLA '87 Proceedings, p. 331–341, 1987.

Bennett, "The Design and Implementation of Distributed Smalltalk," OOPSLA '87 Proceedings, p. 318–330, 1987.

Jul et al., "Fine–Grained Mobility in the Emerald System," *ACM Transactions on Computer Systems*, vol. 6, No. 1, p. 109–133, 1988.

Bennett, "Experience with Distributed Smalltalk," *Software Practice and Experience*, vol. 20 (2), p. 157–180, 1990.

Dowsing et al., "Implementing Object Based Languages on Distributed Computers," *Concurrent Languages in Distributed System*, p. 53–61, 1985.

Black et al., "Distribution and Abstract Types in Emerald," *IEEE Transactions on Software Engineering*, vol. SE–13, No. 1, p. 65–76, 1987.

Schelvis et al., "The Implementation of a Distributed Smalltalk," p. 212–232.

Schuchardt, "GemStone to Smalltalk Interface," p. 1–24, 1986.

Decouchant, "Design of a Distributed Object Manager for the Smalltalk–80 System," OOPSLA '86 Proceedings, p. 444–452, 1986.

Almes et al., "The Eden System: A Technical Review," *IEEE Transactions on Software Engineering*, vol. SE–11, No. 1, p. 43–59, 1985.

"Distributed Objects," *NeXTSTEP General Reference*, vol. 2, Chapter 6, p. 6–1 through 6–18, 1992.

Birrell et al., "Implementing Remote Procedure Calls," *ACM Transactions on Computer Systems*, vol. 2, No. 1, p. 39–59, 1984.

Hailpern et al., "Extending Objects to Support Multiple Interfaces and Access Control," *IEEE Transactions on Software Engineering*, vol. 16, No. 11, p. 1247–1257, 1990.

Levy et al., "Modules, Objects and Distributed Programming: Issues in RPC and Remote Object Invocation," *Software Practice and Experience*, vol. 21, No. 1, p. 77–90, 1991.

Shapiro, "Structure and Encapsulation in Distributed Systems: The Proxy Principle," The $6^{th}$ International Conference on Distributed Computing System IEEE Computer Society, p. 198–205, 1986.

Johnson et al., "The Peregrine High–performance RPC System," *Software—Practice and Experience*, vol. 23(2), pp. 201–221, Feb. 1993.

Bershad et al., "Lightweight Remote Procedure Call," *Transactions on Computer Systems*, vol. 8(1), pp. 37–55, Feb. 1990.

Oney, Walter, "Mix 16–bit and 32–bit code in the applications with the Win32s Universal Thunk," *Microsoft Systems Journal*, vol. 8(11), pp. 39(16).

Hamilton et al., "Subcontract: A Flexible Base for Distributed Programming," *Sun Microsystems Laboratories, Inc.*, 1993, pp. 2–13.

* cited by examiner

REMOTE PROCEDURE CALL METHOD

FIELD OF THE INVENTION

The present invention relates to distributed processing of an application on a computer network and, in particular, to distributed processing in which a computer client uses a remote procedure call to initiate execution of a procedure on a computer server.

BACKGROUND AND SUMMARY OF THE INVENTION

Computer networks allow different parts of an application program to be executed by different computers. Traditional distribution of application processing used a transportation-based model of network operation in which an application program used relatively low level I/O commands of the network operating system.

More recently, a procedure-based model has been developed to allow an application program to use relatively high level commands or calls to distribute processing of the application. A procedure-based model of distributed processing may be implemented as a remote procedure call facility, such as the type incorporated in the Windows NT operating system of Microsoft Corporation.

Computer programs typically include one or more functions, procedures, or similar program units that are referred to herein as "procedures." Each procedure generally includes a block of programming or code that implements a particular operation or functionality on a set of values referred to as parameters or arguments.

Whenever the operation or functionality is to be performed, a call is made to the procedure. The call passes to the procedure values or parameters as arguments, together with control of the processor. After the procedure is completed, control returns to the point in the program following the call, together with any resulting value or values generated by the procedure.

Procedure calls may access procedures that are local to the calling processor. Alternatively, an application program executed on one computer (the "client") may use a remote procedure call to have another computer (the "server") perform a selected procedure.

The remote procedure call is generated by and modeled in the application program in the client in substantially the same manner as a conventional local procedure call would be. The remote procedure call typically includes parameters that are, include, point to, or identify data or data structures used to execute the remote procedure.

Stub procedures that are generated by a remote procedure call facility, typically a component of the network operating system, format the remote procedure call parameters for transmission to the server. As a result, an application programmer may use distributed processing of an application program without incorporating into it low level network transport instructions.

Whenever an application program makes a remote procedure call, the application accesses a client stub procedure that formats or marshals the remote procedure call parameters within a buffer for transmission over the network to the server. The client stub procedure may be included in the application program or a separate dynamic-link library (DLL) of stub procedures used by the application. The marshalling of the parameters may include, for example, resolving references to parameters in the remote procedure call and attaching any data structures or parameters referred to by pointers.

The client stub procedure also calls a runtime procedure that executes transmission of the marshalled buffer containing the remote procedure call parameters to the server. The execution of transmission by the runtime procedure includes identifying the server where the remote procedure should be executed, determining the transport mechanism used by the server, and sending the call to the server.

A runtime procedure on the server receives the remote procedure call request and delivers an RPC buffer containing the remote procedure call parameters to a server stub procedure. The server stub procedure unmarshals each of the parameters separately, which includes separately allocating server memory for each parameter and any of the data structures it references through pointers, and then copying the parameters or data structures from the RPC buffer into the newly allocated server memory.

The server stub procedure then calls the server to execute the remote procedure. After the remote procedure is completed, the server stub procedure marshals any output parameters or return values to be transmitted back to the client. The server stub procedure then frees the memory it allocated to hold the remote procedure call parameters and returns to the runtime procedure.

The goals of distributed application processing are to improve the speed at which an application is executed and the efficiency with which network processing resources are used. Due to the relative performance capabilities or availability of resources at different processors, such improvements can be obtained despite the resources required to transmit and interpret remote procedure calls and their results.

However, the processing of remote procedure calls is typically considered to require at least certain minimum system resources. Unmarshalling remote procedure call parameters at a server is one of the required processes that can be particularly burdensome on system resources.

Memory allocation and subsequent freeing are relatively demanding of system resources. Separately allocating server memory for each parameter and data structure of a remote procedure call could possibly require hundreds of separate memory allocations for a single remote procedure call. Such repeated execution of a demanding system process such as memory allocation can severely limit the performance of remote procedure calls.

In accordance with the present invention, a computer network includes a client and a server which are preferably independently operable computers that cooperate to perform different procedures of an application program. The server executes its procedure in response to a remote procedure call transmitted over the computer network from the client.

The remote procedure call typically includes parameters that are, include, point to, or identify data or data structures that are arguments used by the remote procedure. The parameters, including data and data structures, all have selected data formats according to a client system data format used by the client.

The server receives the remote procedure call at an RPC buffer. In accordance with the present invention, the server determines whether the data format of the remote procedure call parameters match a server system data format used by the server. Preferably, the server system data format includes a byte order format and a server memory format.

Whenever the data format of a remote procedure call parameter in the RPC buffer matches the server system data format, the remote procedure call parameter is unmarshalled while it resides in the RPC buffer. Whenever the data format of a remote procedure call parameter in the RPC buffer does not match and cannot be converted to match the server system data format, server memory is allocated for the remote procedure call parameter and it is copied from the RPC buffer to the allocated server memory for unmarshalling in the conventional manner.

Unmarshalling remote procedure call parameters while they reside in the RPC buffer ("in situ unmarshalling") eliminates separate allocation of server memory for each parameter or data structure. Since allocating memory expends substantial system time or resources, eliminating repetitious use of the memory allocation process according to this invention can significantly enhance the performance capabilities of remote procedure calls.

Remote procedure call parameters, including data and data structures, may be either of two possible byte order formats according to the client system data format. The two byte order formats, sometimes called Endians or Endian formats, relate to the relative positions of the most- and least-significant bytes in a data structure. The server system data format is also one of the two possible byte order formats.

In accordance with another aspect of this invention, the server determines whether remote procedure call parameters and the server system data format have the same byte order format. Whenever the remote procedure call parameters and the server system data format have different byte order formats, the byte order format of the remote procedure call parameters is converted to match the byte order format of the server system data format while the parameters reside in the RPC buffer. As a result, remote procedure call parameters can be unmarshalled from within the RPC buffer according to this invention regardless of whether the client and server share the same byte order format.

The foregoing and other features and advantages of the preferred embodiment of the present invention will be more readily apparent from the following detailed description, which proceeds with reference to the accompanying drawings.

DETAILED DESCRIPTION OF PREFERRED EMBODIMENT

Figure 1:
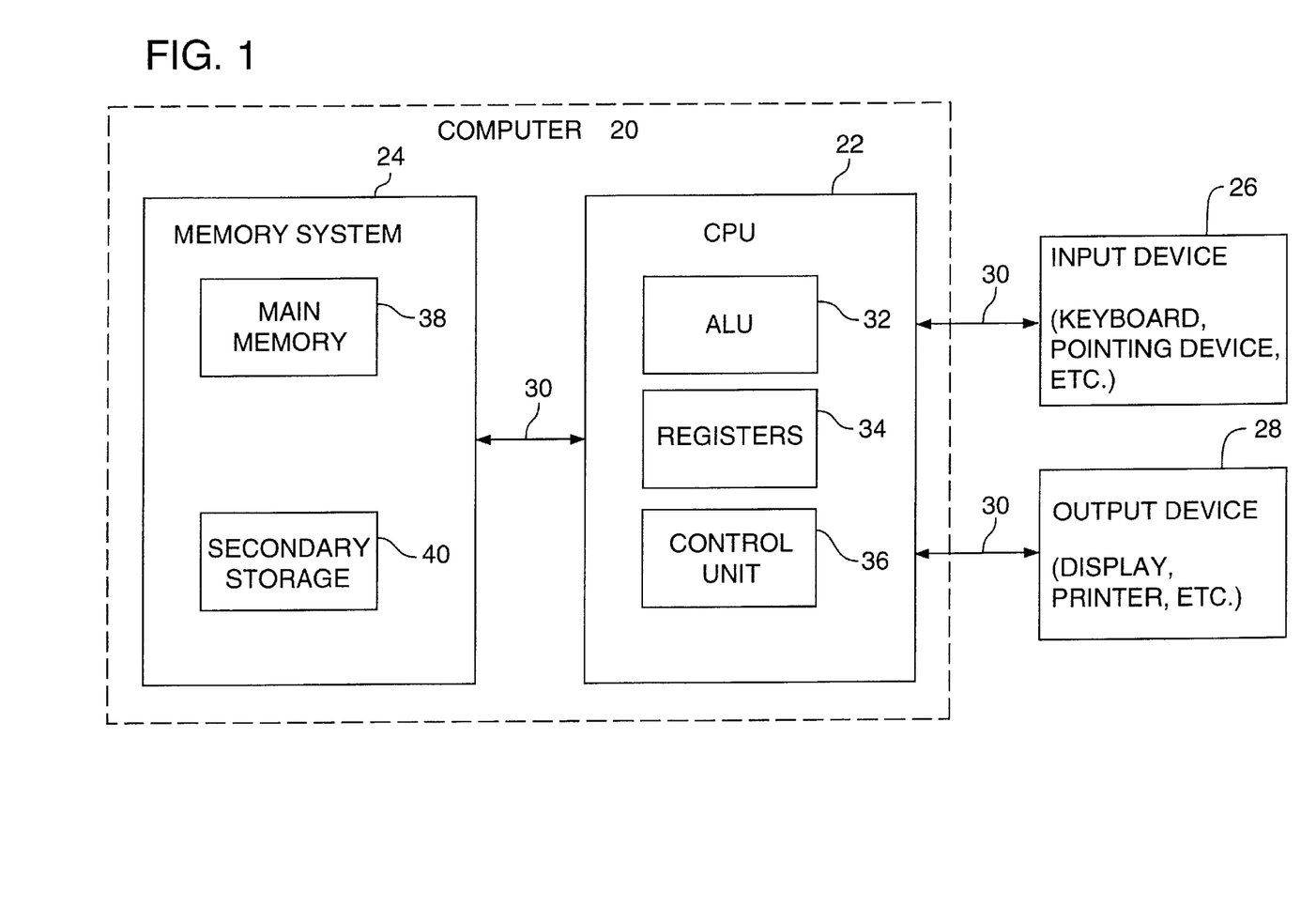
FIG. 1 is a block diagram of a computer system used for the preferred embodiment of this invention.

Referring to FIG. 1, an operating environment for the preferred embodiment of the present invention is a computer system 20 that comprises at least one high speed processing unit (CPU) 22, in conjunction with a memory system 24, an input device 26, and an output device 28. These elements are interconnected by a bus structure 30.

The illustrated CPU 22 is of familiar design and includes an ALU 32 for performing computations, a collection of registers 34 for temporary storage of data and instructions, and a control unit 36 for controlling operation of the system 20. CPU 22 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 24 includes main memory 38 and secondary storage 40. Illustrated main memory 38 takes the form of 16 megabytes of semiconductor RAM memory. Secondary storage 40 takes the form of long term storage, such as ROM, optical or magnetic disks, flash memory, or tape. Those skilled in the art will recognize that memory 24 can comprise a variety of alternative components.

The input and output devices 26, 28 are also familiar. The input device 26 can comprise a keyboard, a mouse, a physical transducer (e.g. a microphone), etc. The output device 28 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 24.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 24, as well as other processing of signals. The memory locations where data bits are maintained are physical locations that have particular electrical, magnetic, or optical properties corresponding to the data bits.

Figure 2:
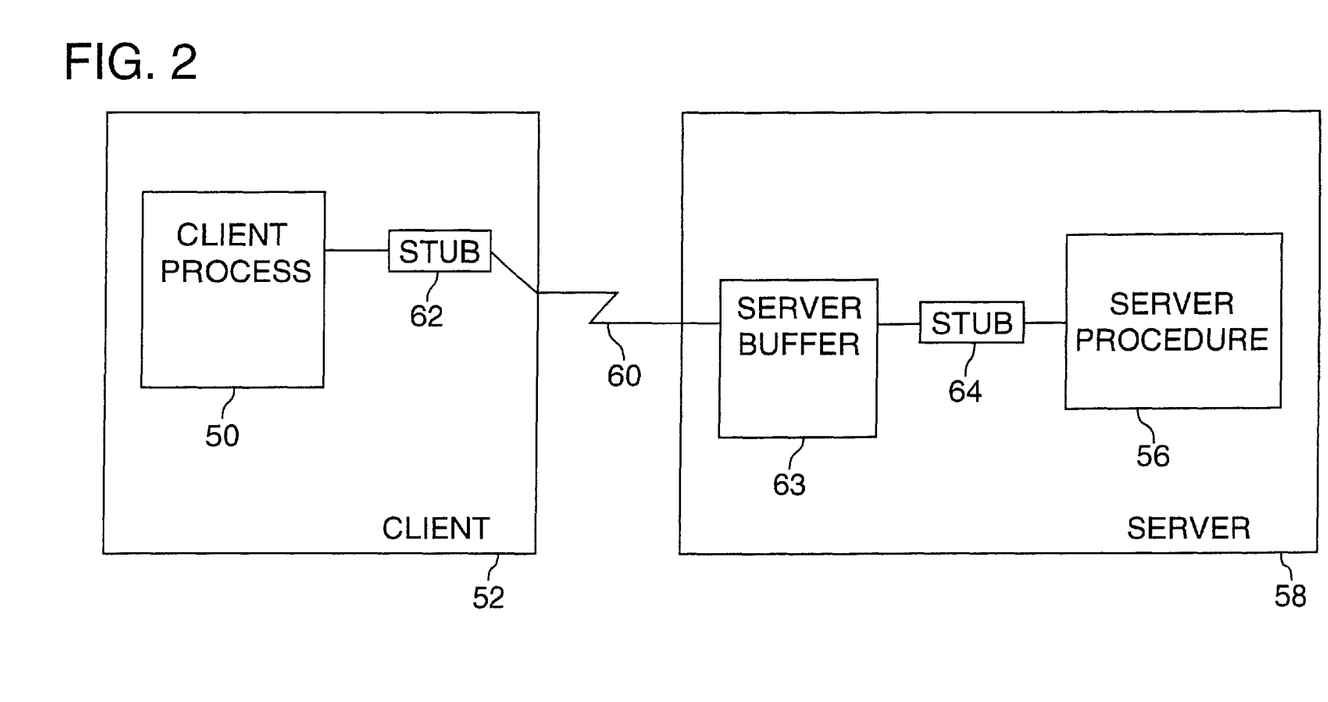
FIG. 2 is a block diagram of the components of a computer network used for the preferred embodiment of this invention.

FIG. 2 is a functional block diagram showing components employed in executing a remote procedure call according to with the present invention. A client process 50 that is included in an application program executed on a computer client 52 generates a call for the execution of a server procedure 56 on a computer server 58. Client 52 and server 58 are each preferably a computer of a type similar to computer system 20 shown in FIG. 1 and independently operable. Client 52 and server 58 communicate with each other over a computer network 60.

A client stub procedure 62 receives the call generated by client process 50 and formats or marshals it for transmission to server 58. Client stub procedure 62 may be held in a dynamic-link library (DLL) as is known in the art. The marshalling of the call may include, for example, resolving references to the remote procedure call and attaching any data structures or parameters referred to by pointers in the call.

Client stub procedure 62 accesses a runtime procedure (not shown) that executes transmission of the remote procedure call to server 58, including identifying server 58 where server procedure 56 will be executed, determining the transport mechanism over network 60 used by server 58, and sending the call to server 58. The runtime procedure also transmits to the server a format label or header identifying the format of the remote procedure call parameters.

For example, the format label may indicate the type of character representation to follow (e.g., ASCII or another format), the integer and floating-point byte order (e.g., Big Endian or Little Endian), and the floating-point representation format (e.g., IEEE, Vax, Cray, or IBM). The remote procedure call parameters may be, include, point to, or identify any of a variety of data structure types or arrangements. The parameters may be characters or integer or floating-point values, and may correspond to arrays, strings, unions, or pointers.

Server 58 receives the remote procedure call at an RPC buffer 63 that is associated with network operation. A server stub procedure 64 interprets or unmarshals the remote procedure call while it resides in RPC buffer 63, as described below, and delivers the call to server procedure 56 for execution.

After execution of server procedure 56 is completed, server stub procedure 64 marshals and transmits the results to client 52 in the same manner that client stub procedure 62 marshalled and transmitted the remote procedure call to server 58. Client stub procedure 62 interprets the results and returns them to client process 50 in the same manner in which server stub procedure 64 interpreted the remote procedure call at server 58.

Stub procedures 62 and 64 are generated by an interface definition language interface (IDL) compiler based on a program description and a network identifier for server procedure 56 and any other remote procedures and a specification of whether parameters are inputs, outputs, or both. The IDL compiler is preferably a component of a remote procedure call facility. All remote procedure references are resolved whenever client process 50 links to client stub procedure 62, which simplifies the accessing of remote procedures within an application program.

Figure 3A:
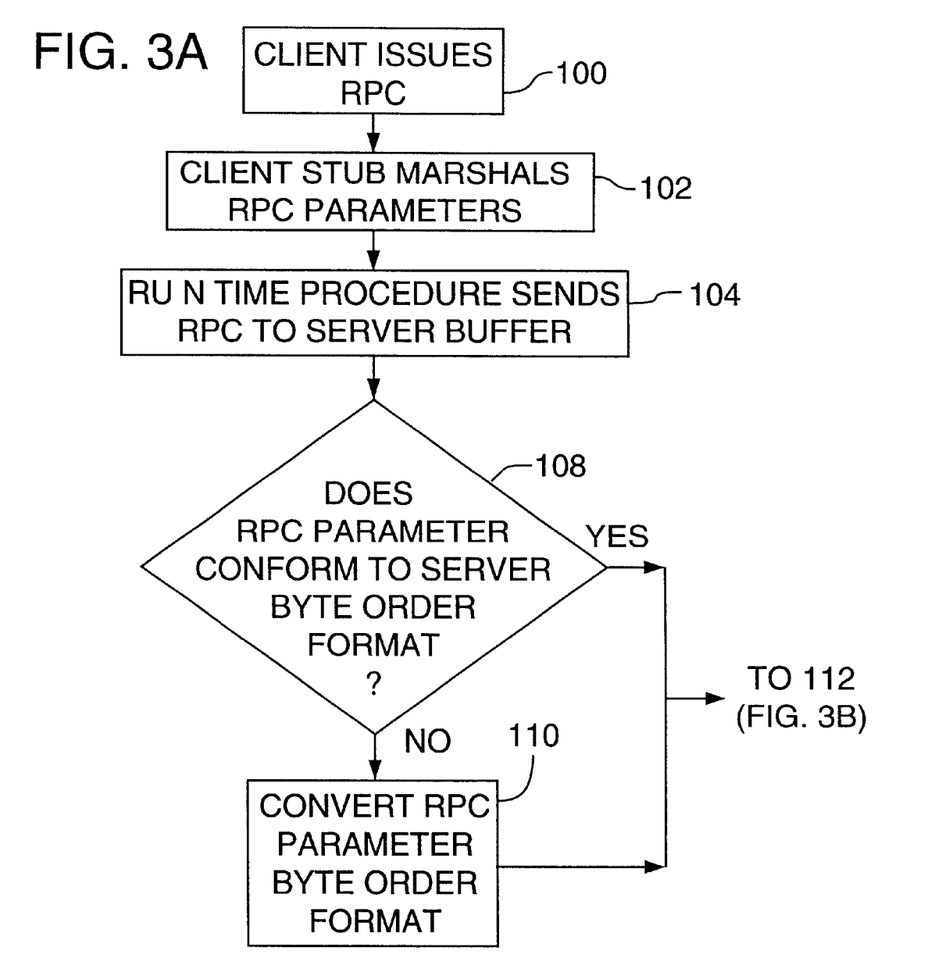
FIGS. 3A and 3B are a flow diagram of a remote procedure call method according to the present invention.
Figure 3B:
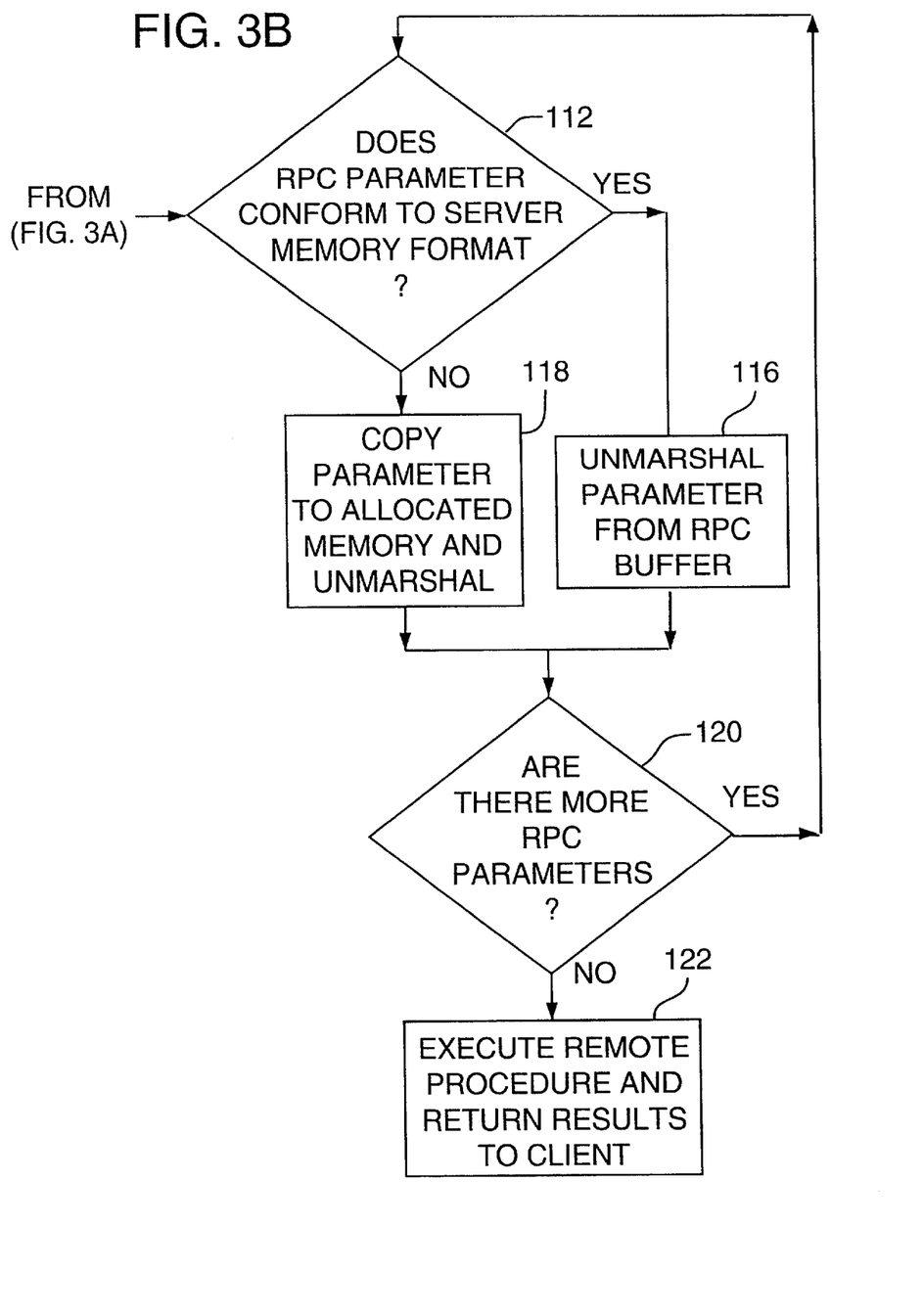

FIGS. 3A and 3B are a flow diagram showing a preferred method of communicating a remote procedure call from client 52 to server 58 via computer network 60.

Process block 100 indicates that client process 50 on client 52 issues a remote procedure call to be performed by server procedure 56 executed on server 58. The remote procedure call is modeled within client process 50 substantially the same as a conventional local procedure call.

Process block 102 indicates that client stub procedure 62 corresponding to the remote procedure call is activated to marshal the parameters accompanying the remote procedure call for transmission to server 58. The marshalling of the parameters may include, for example, resolving references to parameters in the remote procedure call and attaching any data structures or parameters referred to by pointers.

Process block 104 indicates that client stub procedure 62 calls a runtime procedure that executes transmission of the remote procedure call to server 58. The transmission includes a message structure indicating the data type and format of the remote procedure call parameters, including the byte order format. In accordance with standard network data representations, client 52 transmits the remote procedure call without polling server 58 about its byte order format.

Decision block 108 represents an inquiry as to whether a remote procedure call parameter has a byte order format that is the same as that employed by server 58. The byte order format refers to the relative positions of the least- and most-significant bytes (LSB and MSB) in digital values processed by a processor.

The two byte order formats are referred to as Big-Endian and Little-Endian and are used on processors manufactured by, for example, Motorola and Intel, respectively. Decision block 108 proceeds to process block 110 whenever the remote procedure call parameter does not conform to the server byte order format and otherwise proceeds to decision block 112.

Process block 110 indicates that the byte order format of the remote procedure call parameters is converted by server stub procedure 64 while the parameters reside in RPC buffer 63. The conversion may be performed by conventional conversion processes such as a shift and rotate of bits representing the parameters or by byte swapping.

Decision block 112 represents an inquiry as to whether the remote procedure call parameter in RPC buffer 63 conforms to a server memory format of server 58. The parameters considered for conformity to the server memory format include data and data structures included in, pointed to, or identified by other parameters.

Conformity to the server memory format indicates that the remote procedure call parameter would have the same representation in RPC buffer 63 and the server memory. Conformity to the server memory format by the remote procedure call parameter can depend on whether client 52 has a client memory format that matches the server memory format or a memory format implemented by client process 50, client stub procedure 62, or any other related process or application. Decision block 112 proceeds to process block 116 whenever the remote procedure call parameter conforms to the server memory format and otherwise proceeds to process block 118.

The server memory format includes several data representation conventions that provide uniformity in the way data is stored in the server memory. Pertinent data representations include the size of data structures or types (e.g., 20 bytes or 24 bytes), the layout or positions of individual fields within data structures (e.g., long integers, short integers, and pointers), and the alignment of data structures relative to data structure boundaries (e.g., boundaries of 4 bytes or 8 bytes).

Process block 116 indicates that server stub procedure 64 unmarshals the remote procedure call parameter while it resides in RPC buffer 63. Unmarshalling includes reading and processing any pointers, including pointers embedded within parameters, to reconstruct the procedure call and activate server procedure 56 on server 58.

By unmarshalling the remote procedure call parameter while it resides in RPC buffer 63, server 58 does not allocate server memory for each remote procedure call parameter, including data and data structures. Eliminating the allocation of server memory for each remote procedure call parameter can substantially enhance the performance capabilities of remote procedure calls.

Process block 118 indicates that server stub procedure 64 allocates a separate memory (not shown) in server 58 for the remote procedure call parameter and copies the remote procedure call parameter from RPC buffer 63 into the allocated server memory. After copying the remote procedure call parameter to the allocated memory, server stub procedure 64 interprets or unmarshals the parameter.

Decision block 120 represents an inquiry as to whether the server memory formats of any remote procedure call parameters remain for comparison to the server memory format. Decision block 120 returns to decision block 112 whenever a remote procedure call parameter remains and otherwise proceeds to process block 122.

Process block 122 indicates that server 58 executes called procedure 56 and, in cooperation with server stub procedure 64, transmits any results over network 60 to client process 50. As is known in the art, transmission of server procedure results to client process 50 is the same as conventional transmission of remote procedure call parameters to server procedure 56, including delivering the server results to a client RPC buffer (not shown).

A benefit of this invention is that the determination of conformity to the server memory format extends below the levels of conventional parameters to data or data structures in or identified by conventional parameters. This allows significant reduction in the number of memory allocations for various types of conventional parameters.

One example is a parameter that is a pointer to a data structure. The pointer could match the server memory format while the data structure does not. As a consequence, the data structure would require a separate memory allocation under process block 118.

Another example is a parameter that is a data structure with pointers to many other data structures. All data structures and pointers that conform to the server memory format can be unmarshalled from RPC buffer 63 according to process block 116. Data structures that do not conform to the server memory format would require a separate memory allocation under process block 118.

Table 1 below lists test results comparing conventional processing of remote procedure calls against the remote procedure call method of the present invention for a variety of specified parameter types transmitted to (in) or from (out) a server. The "speedup" indicates the percentage by which the present invention reduced the amount of time required for conventional processing of the remote procedure calls.

Table 1 shows that the remote procedure call method of this invention provides performance improvements for all the parameter types listed for transmissions to and from a server. For many of the parameter types, the performance enhancements are greater than 30 percent.

TABLE 1

| Test Case | Prior RPC | New RPC | Speedup |
| --- | --- | --- | --- |
| array of longs in | 13.546 | 11.098 | 18% |
| array of longs out | 16.265 | 15.925 | 2% |
| array of longs in/out | 31.674 | 30.697 | 3% |
| array of ref plongs in | 99.332 | 33.907 | 66% |
| array of ref plongs in/out | 117.751 | 59.753 | 49% |
| array of unique plongs in | 110.738 | 43.557 | 61% |
| array of unique plongs in/out | 148.622 | 83.619 | 44% |
| byte string in | 25.639 | 21.018 | 18% |
| byte string out | 33.966 | 30.577 | 10% |
| byte string in/out | 49.492 | 46.917 | 5% |
| char string in | 25.703 | 19.067 | 26% |
| char string out | 33.975 | 30.577 | 10% |
| char string in/out | 49.558 | 46.907 | 5% |
| array of structs in | 26.557 | 13.301 | 50% |
| array of structs out | 29.577 | 18.826 | 36% |
| array of structs in/out | 58.143 | 34.867 | 40% |
| array of conformant structs in | 49.885 | 28.229 | 43% |
| array of conformant structs in/out | 81.279 | 63.74 | 22% |
| array (3d) of structs in | 26.455 | 13.292 | 50% |
| array (3d) of structs out | 29.238 | 18.755 | 36% |
| array (3d) of structs in/out | 57.79 | 34.277 | 41% |

The tests were conducted on remote procedure calls executed in accordance with procedures generated by different versions of the Microsoft interface definition language interface (MIDL) compiler. The tabulated values are the time in seconds to perform 500 iterations of a remote procedure call carrying the specified parameter type. The tests were performed on a personal computer with an Intel 486/33MHz processor and 16 megabytes of main memory operating under a Windows NT version 3.51 (beta) operating system of Microsoft Corporation.

Most of the parameter types listed are conventional. A "plong" is a pointer to a long (a 32 bit integer). A "ref" pointer is always non-null (always valid). A "unique" pointer can have either a null (invalid) or non-null value. The array of longs is 32K bytes (8192 longs) in total size. The arrays of ref plongs and unique plongs were 4096 elements each. The byte strings and char strings were all 32K in length. The array of structs were 2730 elements of 12 byte structures each. The conformant struct arrays were 862 elements each of pointers to 36 byte structures. The 3 dimensional arrays of structs were a total of 2725 elements of 12 byte structures.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. In a computer network having a client and a server that execute respective client and server procedures of an application program, the server executing the server procedure in response to a remote procedure call from the client transmitted over the computer network, the remote procedure call including plural remote procedure call parameters of selected formats, the server receiving the remote procedure call parameters at an RPC buffer and executing a server stub procedure, a method of providing the remote procedure call parameters to the server procedure at the server, comprising:

determining with the server stub procedure at the server whether the selected format of a remote procedure call parameter in the RPC buffer matches a data structure format processed by the server;

whenever the selected format of the remote procedure call parameter in the RPC buffer matches the data structure format processed by the server, unmarshalling the remote procedure call parameter in place with the server stub procedure, while the remote procedure call parameter resides in the RPC buffer;

whenever the selected format of the remote procedure call parameter in the RPC buffer does not match the data structure format processed by the server, unmarshalling the remote procedure call parameter with the server stub procedure while the remote procedure call parameter resides in the server; and activating the server procedure with the server stub procedure.

2. The method of claim 1 in which the remote procedure call parameters and the data structure format processed by the server computer are each one of a pair of byte order formats, the method further comprising:

determining at the server whether the remote procedure call parameters are of the same byte order format as the data structure format processed by the server; and whenever the remote procedure call parameters and the data structure format processed by the server are of different byte order formats, converting the byte order format of the remote procedure call parameters to match the byte order format of the data structure format processed by the server in place, while the remote procedure call parameters reside in the RPC buffer.

3. The method of claim 1 in which the remote procedure call parameters are of a first byte order format and the data structure format processed by the server computer is of a second byte order format, the method further comprising converting the first byte order format of the remote procedure call parameters to the second byte order format in place, while the remote procedure call parameters reside in the RPC buffer.

4. The method of claim 1 in which at least one of the remote procedure call parameters is interpreted without copying it from the RPC buffer whenever the selected format of the remote procedure call parameter in the RPC buffer matches the data structure format processed by the server.

5. The method of claim 1 in which the data structure format processed by the server includes a server memory format.

6. The method of claim 1 in which the remote procedure call parameters include RPC data structures having selected formats, the method further comprising:

determining at the server whether the selected formats of the remote procedure call parameters and RPC data structures match a data structure format processed by the server; and whenever the selected format of a remote procedure call parameter or RPC data structure in the RPC buffer matches the data structure format processed by the server, interpreting the remote procedure call parameter or RPC data structure in place, while it resides in the RPC buffer.

7. A computer-readable storage medium having computer-executable instructions for performing the steps recited in claim 1.

8. In a server computer executing a server procedure of an application program in communication with a client procedure of an application program executing on a client computer, the server executing the server procedure in response to a remote procedure call from the client transmitted over a computer network, the remote procedure call including a remote procedure call parameter of a selected format, the remote procedure call parameter specifiable to the remote procedure with a pointer pointing to the remote procedure call parameter, the server receiving the remote procedure call parameter at an RPC buffer and executing a server stub procedure, a method of delivering the remote procedure call parameter to the server procedure, comprising:

with the server stub procedure, comparing at the server the selected format of the remote procedure call parameter in the RPC buffer with a data structure format processed by the server;

with the server stub procedure, unmarshalling the remote procedure call parameter in the RPC buffer in situ by providing the server procedure with a pointer to the remote procedure call parameter without allocating server memory for the remote procedure call parameter and without copying the remote procedure call parameter whenever the comparing step indicates that the selected format of the remote procedure call parameter matches the data structure format processed by the server;

with the server stub procedure, unmarshalling the remote procedure call parameter while the remote procedure call parameter resides in the server whenever the comparing step indicates that the selected format of the remote procedure call parameter does not match the data structure format processed by the server; and activating the server procedure with the server stub procedure.

9. The method of claim 8 wherein unmarshalling the remote procedure call parameter in the RPC buffer further comprises copying the parameter from the RPC buffer into an allocated memory location whenever the comparing step indicates that the selected format of the remote procedure call parameter does not match a data structure format processed by the server.

10. The method of claim 1 wherein the data structure format processed by the server is a data structure format selected from the group consisting of the size of data structures, the size of types, the layout of individual fields within data structures, and the alignment of data structures relative to data structure boundaries.

11. In a computer network having a client computer and a server computer that execute respective client and server procedures of an application program, the server executing the server procedure in response to a remote procedure call from the client transmitted over the computer network, the remote procedure call comprising a remote procedure call parameter of a selected format, the server receiving the remote procedure call parameter at an RPC buffer, a method of delivering the remote procedure call parameter in the RPC buffer to the server procedure, comprising:

upon receipt of the remote procedure call at the server, executing a server stub procedure in the server operative for delivering the remote procedure call parameter to the server procedure;

determining in the server stub procedure whether the selected format of the remote procedure call parameter in the RPC buffer matches a data structure format processed by the server;

whenever the selected format of the remote procedure call parameter in the RPC buffer matches the data structure format processed by the server, unmarshalling the remote procedure call parameter with the server stub procedure while the remote procedure call parameter resides in the RPC buffer without allocating server memory for the remote procedure call parameter;

whenever the selected format of the remote procedure call parameter in the RPC buffer does not match the data structure format processed by the server, unmarshalling the remote procedure call parameter with the server stub procedure while the remote procedure call parameter resides in the server; and activating the server procedure with the server stub procedure.

12. The method of claim 11 wherein the remote procedure call parameter is a first remote procedure call parameter pointed to by a second remote procedure call parameter in the RPC buffer.

13. The method of claim 11 wherein the data structure format processed by the server includes a server memory format;

the remote procedure call parameter is a first remote procedure call parameter;

the first remote procedure call parameter is a pointer to a second remote procedure call parameter in the RPC buffer having a memory format; and the memory format of the second remote procedure call parameter does not match the server memory format.

14. The method of claim 11 wherein the remote procedure call parameter is a first remote procedure call parameter; and the first remote procedure call parameter is one of a plurality of data structures pointed to by a second remote procedure call parameter in the RPC buffer.

* * * * *